UNITED STATES PATENT OFFICE.

NANNIE W. HUNTER, OF ELIZABETH CITY, NORTH CAROLINA.

IMPROVEMENT IN THE MANUFACTURE OF SOAP.

Specification forming part of Letters Patent No. 70,092, dated October 22, 1867.

*To all whom it may concern:*

Be it known that I, NANNIE W. HUNTER, of Elizabeth City, in the county of Pasquotank, in the State of North Carolina, have invented a new and Improved Mode of Making Hard Soap; and I do hereby declare that the following is a full and exact description thereof, reference being had to the accompanying ingredients and composition.

The nature of my invention consists in the saving of labor, time, and money; that it will wash clothes perfectly clean and white without rubbing or scrubbing, and that it will not injure the finest fabric, and will enliven the color of faded goods.

To enable others to make and use my invention, I will proceed to describe the composition of matter, ingredients, and the manner of producing by boiling the soap, reference to following recipe:

Take Colgate's No. 1 soap, six pounds; sal-soda, six pounds; rosin, half pound; borax, one ounce; laundry-blue, thirty grains; spirits of ammonia, one ounce; water, twelve quarts. Boil all together two hours, except the spirits of ammonia, which add just before taking the soap out of the boiler. Strain it through a sieve into molds. When cold it is ready for use.

The above quantity of ingredients will make twenty pounds of soap.

What I claim as my invention, and desire to secure by Letters Patent, is—

The above-described improvement in making hard soap.

NANNIE W. HUNTER.

Witnesses:
 JAMES L. BALL,
 LEMUEL CORMICK.